United States Patent Office 3,423,312
Patented Jan. 21, 1969

3,423,312
COMPOSITIONS OF MATTER AND PROCESS OF TREATING SEWAGE THEREWITH
Donald Stapf Blaisdell, 1156 Summit Ave., St. Paul, Minn. 55105, and Ruth Elizabeth Barry Klaas, Arden Hills, Minn. (10 Oriole Drive, Wyomissing, Pa. 19610)
No Drawing. Continuation-in-part of application Ser. No. 206,184, June 29, 1962, which is a continuation-in-part of application Ser. No. 724,785, Mar. 31, 1958, and Ser. No. 786,906, Jan. 15, 1959. This application July 22, 1964, Ser. No. 384,542
U.S. Cl. 210—50   17 Claims
Int. Cl. C02b 1/20

ABSTRACT OF THE DISCLOSURE

A sewage additive containing iron ore weighting agent and water-dispersible synthetic organic cationic flocculating material is disclosed. Processes for treating sewage with iron ore weighting agent and water-dispersible synthetic organic cationic flocculating material, including embodiments in which the sewage is first treated with weighting agent and flocculating material and then subjected to catalytic oxidation, are also described.

---

This invention relates to the treatment of sewage, and this application is a continuation-in-part of application for U.S. Letters Patent Ser. No. 206,184 (filed June 29, 1962, by the present inventors), now U.S. Patent No. 3,142,638, which in turn is a continuation-in-part of application for U.S. Letters Patent Ser. No. 724,785 (filed Mar. 31, 1958), now abandoned and Ser. No. 786,906 (filed Jan. 15, 1959), now abandoned by the present inventors. More specifically, this invention relates to novel compositions useful as additives for sewage.

It is an object of this invention to provide novel sewage compositions from which suspended solids settle and can be removed rapidly in treating mechanisms of simple design and modest size.

It is a principal object of this invention to provide a novel type of clarifying agent in the treatment of sewage, which type of clarifying agent causes rapid flocculation and sedimentation of solids, either suspended, dissolved, or both, in said sewage, and makes said solids adapted for easy and rapid removal from the major aqueous component of such sewage, at low cost in treating mechanisms of simple design and modest size.

Still a further object is to provide waters of a relatively high degree of purity by chemical treatment of aqueous liquors containing such wastes as sanitary sewage, industrial wastes or other contaminants.

Various other objects, advantages, and features of this invention will become apparent to those skilled in the art upon reading the specification and appended claims. A broad field of utility for our invention is, of course, the treatment of municipal sewage.

Sewage ordinarily is a dilute aqueous mixture of the waste from household and industry that is convenient and economical to carry away by water. As used in this specification and the appended claims, the term sewage refers to any of the ordinary types of aqueous liquors containing significant amounts of wastes, such as fecal matter, domestic wastes, industrial wastes, and such like, and is not to be construed as being limited to meaning only aqueous liquors which in lay terms are ordinarily called sewages, nor should it be construed as being limited to mean aqueous liquors which have actually been carried through pipe, conduit, or sewers. In some embodiments of our invention, the concentrations of wastes of significance to the application at hand may be only a few parts per million, and in other embodiments the concentrations may be as high as 10,000 parts per million or even higher.

Unless otherwise defined in this specification, the definitions of the terms and tests we use are those set forth in the book, "Standard Methods for the Examination of Water, Sewage, and Industrial Wastes," 10th edition, published in 1955 by the American Public Health Association, of New York city, and such standard handbooks and textbooks of chemistry as: Lange, "Handbook of Chemistry," Handbook Publishers, Inc., Sandusky, Ohio, 1944; Latimer and Hildebrand, "Reference Book of Inorganic Chemistry," revised edition, The Macmillan Company, New York, 1940; Hildebrand, "Principles of Chemistry," 5th Ed., The Macmillan Company, New York, 1947; Fuson and Snyder, "Organic Chemistry," John Wiley & Sons, Inc., New York, 1942; and Glasstone, "Textbook of Physical Chemistry," 2d Ed., D. Van Nostrand Co., Inc., New York, 1946.

We regard an organic polyelectrolytic flocculating material as cationic only if the main bodies of the polymer molecules bear overall positive charges at pH levels commonly encountered in sewage; since the ionization constant of the amine groups in polyacrylamide is about $10^{-15}$, and the ionization constant of carboxylic groups is about $10^{-5}$, a modified polyacrylamide polymer containing even a very low percentage of carboxylic groups would be anionic at some levels of pH commonly encountered in sewage, or the like, and such modified polyacrylamide polymers are intended to be excluded specifically from the class of materials defined in this specification as "water dispersible synthetic organic cationic polyelectrolytic flocculating material."

Chemical treatment of sewage, of course, is well known to those versed in the prior art. Iron and aluminum salts have been used as coagulants or flocculants for sewage, and indeed have a limited degree of effectiveness for removing colloidal solids and very finely divided suspended matter.

Water-insoluble synthetic organic polyelectrolytes (ion exchange resins) have been used in the prior art in the conditioning of certain aqueous liquors, as described in the literature by one of us, and by many others in numerous references. The performance of carboxylic exchangers in the removal of material from certain types of aqueous liquors, for example, has been described by Kunin and Barry, in Industrial and Engineering Chemistry, 41, 1269–72 (1949); by Winters and Kunin, in Industrial and Engineering Chemistry, 41, 460 (1949); by McGarvey and Thompson, Industrial and Engineering Chemistry, 43, 741 (1951); and by others. Such water-insoluble ion exchangers have never found widespread commercial usage in the treatment of municipal sewage, by reason of their relative ineffectiveness especially in the light of their high initial and operating costs, and the general operational difficulties associated with the use of insoluble ion exchangers in aqueous liquors containing suspended solids.

To date, however, no really satisfactory chemical clarifying agent or chemical process for removing from aqueous liquors such as sewage, at acceptable costs and in treating mechanisms of simple design and modest size, suspended solids comprising substantial amounts of organic material has yet been developed. Even in the chemical coagulation of organic solids in raw water supplies, wherein the content of suspended or dissolved organic solids is generally only a few parts per million, acceptable results have been obtained only by using relatively large and expensive treating equipment, and excessively large amounts of chemical coagulant per unit amount of organic solids removed. (See survey of literature included in our copending application for Letters Patent Ser. No. 206,184, which issued on July 28, 1964, as U.S. Patent 3,142,638, and Hawkes, "The Ecology of Waste Water Treatment," Macmillan Company, New York, 1963.)

As noted below, our invention involves flocculation and/or clarification of sewage by novel types of synthetic organic polyelectrolytes, by novel compositions of matter comprising synthetic organic polyelectrolytic polymers, especially cationic polymers, and weighting agent, and/or by oxidation in the presence of novel catalytically active compositions of matter. The efficiency of a weighting agent along with the cationic polymer is really most surprising, since all of the prior art of which we are aware tends to indicate that weighting agents are relatively inefficient, and simply are not economic in any significant proporton of sewage-treating problems. (See especially Gehm, Sewage Works Journal, 13, 681–689 (1941)).

The essence of one embodiment of our invention lies in the interaction of cationic polymers, of the type specified herein, and weighting agent, of the type herein specified, in the treatment of aqueous liquor. Although it is true that the instances of coaction between metal materials (as free metal, ion, or compound) and organic polymers, due apparently to the formation of "partially covalent" or "coordinate covalent" bonds between the metal material and organic polymer (Kunin and Barry, Industrial and Engineering Chemistry, 41, 1269 (1949), and Dow, British Patent 760,869, published Nov. 7, 1956) have been long known, no one has ever, to the best of our knowledge, taken advantage of this type of coaction to produce a synergistic effect in the treatment of sewage.

The extend of the coaction of our cationic polymers and weighting agents in the treatment of sewage—that is, the extent of the synergistic effect obtained—is far greater than the sum of the effects which might reasonably be expected by consideration of the individual components thereof.

Our invention, as described and disclosed herein, provides means for overcoming major disadvantages of the methods of chemical treatment as practiced in the prior art, and makes chemical treatment suitable and economic for treatment of municipal sewages, effluents from septic tanks, cess pools, and the like from individual waste sources, industrial wastes, raw water supplies, and the like.

We have found that the addition of water-dispersible (especially hydrophilic) synthetic organic cationic polyelectrolytic flocculating material having a molecular weight in excess of 10,000 and at least one amine group per 10,000 units of molecular weight, at concentrations of 1 to 300 parts per million parts of sewage, along with iron ore weighting agent having a particle size smaller than 50 mesh (U.S. Standard Screens) flocculates and causes the suspended solids of the sewage to settle out most efficiently. In this manner, the disadvantages of conventional chemical methods of clarifying aqueous liquors, as set forth above, may be substantially overcome, and the objects of this invention, also as set forth above, and other objects, are attained. Especially good results are obtained if the water-dispersible synthetic organic cationic polyelectrolytic flocculating material and iron ore are used in combination with about 1 to about 300 parts by weight of water-dispersible inorganic cationic polyelectrolytic flocculant aid (such as ferric hydroxide in a sol formed by reaction of ferric chloride with a large excess of water and/or aluminum hydroxide in a sol formed by the reaction of sewage-grade alum with a large excess of water) per million parts of sewage.

(Water-dispersible inorganic polyelectrolytic flocculant aids useful in the practice of this invention includes finely ground montmorillonites, attapulgite, Wyoming-type bentonite, calcium bentonite, bentones (amine derivatives of bentonite), bauxite, and the like. In this disclosure, of course, crystals or the like of inorganic polyelectrolytic material which tend, in suspension, to carry overall negative charges (for example, Wyoming-type bentonite) are regarded as inorganic anionic polyelectrolytic flocculant aids, and crystals or the like of inorganic polyelectrolytic material which tend, in suspension, to carry an overall positive charge (for exampule, $Fe_2O_3 \cdot H_2O$ or $Fe(OH)_3$) are regarded as inorganic cationic polyelectrolytic flocculating aids. Inorganic polyelectrolytes as described in this specification have, in general, average molecular weights in excess of about 10,000. By the term "water-dispersible" material, of course, as used in this specification and the appended claims, we mean to include water-soluble materials, as well as more or less solid materials of such fine particle size that, on agitation in water, they settle out of the liquid suspension only slowly and over an appreciable period of time.)

The iron ore weighting agent having a particle size less than 50 mesh (U.S. Standard Screens), generally speaking, of an average particle size in the range of 50 mesh to 200 mesh (U.S. Standard Screens) has been found to coact in synergistic fashion to a most remarkable extent with the water-dispersible synthetic organic cationic polyelectrolyte flocculating material.

The type of process applicable to insure rapid removal of flocs—gravity, magnetic field, electrostatic field, centrifugation, or such like—will in each case of course be determined chiefly by the properties of the specific weighting agent and/or organic polyelectrolytic flocculant employed, and generally to a lesser degree by the nature of the suspended solids in the sewage. Weighting material should be of fairly large particle size—e.g. in the range of 50 to 100 mesh (U.S. Standard Screens) when gravity only is used for sedimentation, but may be of much smaller particle size when magnetic, filtration, centrifugal, or such like method of separation is employed. Additionally there may be added to the sewage along with the other classes of treating materials described above essentially non-ionic absorbents having high surface area per unit volume—such as activated carbon. The classes of treating materials may be combined in various ways, as will be described further herein, to make compositions of matter useful as additives for sewage, industrial wastes, raw water, and the like, especially if there is added separately to the sewage or raw water, in addition to the composition comprising water-dispersible synthetic organic cationic polyelectrolytic flocculating material and iron ore, flocculating material of an electrical charge opposite to that of the water-dispersible synthetic organic polyelectrolyte employed.

We have discovered that the most generally applicable additives for sewage, in the practice of our invention, contain from about 1 to about 100 parts of synthetic organic cationic polyelectrolytic flocculating material and from about 1 to about 100 parts by weight of weighting material and also may contain from about 1 to about 100 parts of inorganic polyelectrolytic flocculant aid and/or from about 1 to about 100 parts by weight of substantially non-ionic absorbent material.

For economic as well as technical reasons, iron ore has been found to be outstanding as a weighting agent. In some cases—especially those in which catalytic effects are desired from the presence of the weighting agent, as in oxidation of the sewage/sewage additive composition by blowing air through same or the clarified liquor obtained therefrom—other weighting agents, generally selected from the substantially water-insoluble compounds (preferably oxides in the case of metals where the oxide employed can be selected to be substantially water-insoluble and non-reactive with water) of metals which form coordinate covalent bonds with amines (e.g., mercury, copper, platinum, cobalt, nickel, silver, thallium) or with ammonia (e.g., cobalt, chromium, platinum, copper, silver, zinc, rhodium, mercury, nickel, gold, osmium, aluminum, thallium) may be admixed with the iron ore in such fashion as to form weighting agent, or in some cases may be used alone or in combination with each other as weighting agents. In general, therefore, weighting agents useful in the practice of this invention are finely ground solids, substantially insoluble in water, having little or no tendency to degrade spontaneously in particle size to particles of colloidal dimensions on standing in water, and having a specific gravity substantially in excess of 1, and preferably above 3. We have found such materials as iron-containing barite, magnetite, hematite, franklinite, iron-containing zirconia, and ilmenite, of an average particle size in the range of 50 mesh to 200 mesh (U.S. Standard Screens) particularly effective. Water-sensitive iron ore materials such as even those clays which contain enough iron to have a yellow or reddish color, which tend to form colloidal stable suspensions in water, are specifically excluded. Likewise it frequently may be desirable to include in the sol of water-dispersible inorganic cationic flocculant aid (generally, of ferric hydroxide or aluminum hydroxide)—if such is used—at least some ions of metals selected from the group consisting of cobalt, chromium, platinum, copper, silver, zinc, rhodium, mercury, nickel, gold, osmium, aluminum and thallium. The type of metal(s) and/or metal compound(s) most useful for catalytic purposes in the oxidation of sewage of course varies with the type of solids in the sewage but almost invariably will be selected from the group consisting of iron, cobalt, manganese, osmium, silver, copper, tin, vanadium, cerium, titanium, platinum, nickel, uranium, chromium, mercury, molybdenum, aluminum, tungsten, selenium, palladium, and lead—but perhaps most frequently copper or cobalt or both will be selected; in instances where it is impractical to include the catalytically active metal(s), metal compound(s) or both in the weighting agent or water-dispersible inorganic cationic flocculant aid or both, it will usually be possible to include such catalytically active material as a component of the sewage-treating equipment—for example, as a metal screen or as a metal or metal oxide-bead bed in the air oxidation chamber of the sewage-treating equipment. As noted above, we have found compounds of copper and cobalt especially useful oxidation catalysts in the aeration of sewage; copper itself, in the form of metal mesh screening, also serves well as a catalyst in air oxidation procedures. (See "The Chemistry of the Coordination Compounds," Edited by J. C. Bailar Jr., New York, Reinhold Publishing Corp., 1956, especially front inside cover, pages 1 through 99 and 416 through 471; also, Hildebrand, "Principles of Chemistry," 5th Ed., New York, The Macmillan Co., 1947, pages 82 through 104 and 146 through 152, and Latimer and Hildebrand, "Reference Book of Inorganic Chemistry," Revised Edition, New York, The Macmillan Company, 1940, especially pages 98 to 100.)

Substantially non-ionic absorbent material of fine particle size (generally speaking in the range of 50 to 200 mesh, U.S. Standard Screens) and having a surface area of at least 10 square meters per gram of material may be used in combination with synthetic organic polyelectrolytic flocculating material and weighting materials and (optionally) also polyelectrolytic flocculant aids in the compositions of matter and processes described herein. In applications of this kind, we have found various grades of activated charcoal and like material effective.

Water-dispersible synthetic organic cationic polyelectrolytic flocculating materials most useful in the practice of this invention include water-dispersible types containing primary amine, secondary amine, tertiary amine, quaternary amine groups, or combinations thereof. Generally speaking, the most effective types of polyelectrolytes have average molecular weights in excess of about 10,000. We have found water-dispersible polymerized ethylene imine and derivatives thereof obtained by reacting said polymerized ethylene imine with aqueous hydrochloric acid and with various amounts of ethyl bromide or aqueous ethyl alcohol and like derivatives to be especially effective in the treatment of sewage and the like. In addition, we have found that water-dispersible melamine-formaldehyde resins, urea-formaldehyde resins, and the like, and compositions obtained by heating said resins with various amounts of an amine such as pyridine, in hot aqueous hydrochloric acid, and like derivatives, are also useful to attain at least to some degree the objects of this invention.

Although all of the cationic synthetic organic polyelectrolytes described herein are in themselves effective to a small extent for attaining at least some of the objects of this invention, we have found, as noted above, that far better results may be achieved, at far lower cost per volume of sewage treated, by using along with the water-dispersible synthetic organic cationic polyelectrolytic flocculating material, weighting material and preferably also cationic inorganic polyelectrolytic flocculant aid and (optionally) substantially non-ionic absorbent material, all of these latter classes being of the types used in the compositions and process specified elsewhere herein.

For best results, we have found that the water-dispersible synthetic organic cationic polyelectrolytic flocculating material used in our compositions and processes should have at least one amine group per 10,000 units of molecular weight. Especially good results are obtained when the amine employed is primary or secondary, rather than tertiary, quaternary or "hybrid" amine-containing group, and when the molecular structure of the organic cationic flocculating material contains an amine group removed two or three carbon atoms along the skeletal structure of the polymer from a substituent amine or hydroxyl group—that is, when the polymer contains groupings such as

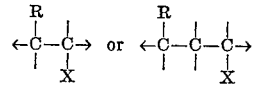

wherein "R" is a hydroxyl or amine group and "X" is an amine group. Thus, cationic starch of the type designated herein has been found to be, under conditions also as specified herein, extraordinarily efficient, in combination with iron ore weighting agent.

Generally speaking, the polymers of utility in the practice of our invention are hydrophilic—that is, they tend to be quite readily "soluble" in water at the concentrations of use, and have at least one oxygen or nitrogen atom for every ten carbon atoms (and usually for every one or two carbon atoms) in the molecular structure of the polymer.

Cationic starch is especially useful in the practice of our invention, although other cationic polymers may be used. Thus, the disadvantages of conventional chemical methods of clarifying aqueous liquors, as set forth above, may be substantially overcome, and the objects of this invention, also set forth above, and other objects, are attained by employing as a clarifying agent for sewage a composition of matter comprising water-dispersible cationic starch having an average molecular weight of about 1,000,000, and iron ore having a particle size smaller than 50 mesh (U.S. Standard Screens), said cationic starch and said iron ore weighting agent being employed in amounts sufficient to cause flocculation and accelerated sedimentation of solids in said sewage, and thereafter separating from the sewage an aqueous portion substantially free of suspended solids. In the treatment of many classes of sewage, even more outstanding results may be obtained in overcoming the disadvantages of conventional chemical methods of clarifying sewage, and in attaining the objects of this invention, as set forth above, and other objects, by employing a method of clarifying aqueous liquor, which comprises mixing with said liquor separately (a) water-dispersible cationic starch having an average molecular weight of about 1,000,000, and iron ore weighting agent having a particle size smaller than 50 mesh (U.S. Standard Screens), and (b) anionic flocculating material, said cationic starch, said iron ore weighting agent, and said anionic flocculating material being employed in amounts sufficient to cause flocculation and accelerated sedimentation of solids in said sewage, and thereafter separating from the sewage compositions formed an aqueous portion substantially free of suspended solids.

In the practice of our invention, as described and disclosed herein, we have found that water-dispersible cationic starches having average molecular weights of about 1,000,000 give excellent results, although some degree of effectiveness has been demonstrated in the use of cationic starches having molecular weights as low as about 10,000, and also in the range of molecular weights (as in slightly cross-linked starches) above 1,000,000 and indeed on the order of several million. Accordingly, our specification of molecular weight in the phrase "cationic starch having an average molecular weight of about 1,000,000" is intended to be an "order-of-magnitude" term only—that is, we mean to have it understood by the term "molecular weight of about 1,000,000" the whole range of molecular weights from somewhat above 10,000 to perhaps above 10,000,000, or as high a molecular weight as the cationic starch retains the property of dispersibility in water. We have found that cationic starches, to be well adapted for use in this invention, should have at least one basic (normally, amine) group for every 40 to 50 anhydroglucose units (equivalent to about 10,000 units of molecular weight) in the starch molecule, and that the ionization constant of the basic groups employed should be larger than $10^{-11}$ and preferably on the order of $10^{-5}$ or even higher.

Water-dispersible negatively charged flocculating agents (that is, anionic flocculating material) useful in the practice of this invention have been, for the most part, anionic polyelectrolytes having molecular weights in excess of about 10,000, of sufficient ionization strength (or containing phenolic, carboxylic, sulfonic, or phosphorus-containing acidic groups) to form salts with alkali cations to a substantial extent in water dispersion at pH values below 12, and certain compositions of matter comprising such anionic polyelectrolytes.

In any consideration of the following examples, it should of course be kept in mind, as will be obvious to those skilled in the art, that the optimum dosage of chemical coagulants for any particular sewage to be treated is distinctly an individual problem, and can be best determined only by actual tests (Babbitt and Bauman, "Sewerage and Sewage Treatment," 8th Ed., John Wiley and Sons, Inc., New York, 1958, page 449; Water Works and Sewerage, 81, 358 (1938)). However, we have generally found the optimum concentrations of each of the chemical classes used in our invention—viz, cationic polymer of the type herein described, iron ore weighting agent, and (optionally) negatively charged flocculating agent—lie in the range of from about 1 to about 300 parts of chemical per million parts of aqueous liquor to be treated, and quite generally in the range substantially below about 10 parts of chemical per million parts of aqueous liquor to be treated; that is, in specifying chemical dosages, the numbers we actually give can be only approximate, and, as it were, "order-of-magnitude" terms.

The tests of clarification of aqueous liquors (sewages) set forth in the examples below were run in standard Imhoff cones, according to a method adapted from the standard procedure for sewage sedimentation tests set forth in the book, "Standard Methods for the Examination of Water, Sewage, and Industrial Wastes," Tenth Edition, published in 1955 by the American Public Health Association, of New York City (page 272). In each instance, the aqueous liquor to be processed was poured into a standard Imhoff cone having a capacity of 1000 milliliters, the chemical reagent(s) added at the top, the liquor composition stirred for approximately ten seconds with a glass rod 6 millimeters in diameter and 40 centimeters long, and the whole composition then allowed to settle for 7½ to 60 minutes.

The clarity index of the supernatant liquor obtained in our tests after various periods of sedimentation was measured by observing the amount of light, in foot-candles, transmitted through a layer of supernatant liquor 5 inches thick, from a white-light source of constant intensity. Raw, unsettled aqueous liquor, before chemical or mechanical treatment of any kind, was assigned a "Clarity Index" of 100. The "Clarity Index" of a treated liquor was calculated by dividing the amount of light, in foot-candles (from the white-light source of constant intensity previously described), transmitted through a layer of the treated liquor 5 inches thick, by the amount of light, in foot-candles, transmitted from the same light source through a layer of raw unsettled liquor 5 inches thick under the same conditions, and then multiplying the resultant ratio by 100. For example, if the amount of light transmitted under the standard conditions described was 6 foot-candles in the case of treated liquor and only 4 foot-candles in the case of raw unsettled liquor, the "Clarity Index" of the treated liquor was calculated to be $(6/4) \times 100$, or 150. The "B.O.D. Index" (Biochemical Oxygen Demand Index) was calculated in somewhat analogous fashion: the "B.O.D. Index," as set forth in the tables below, refers to a calculated index value obtained by measuring the proportion of biochemical oxygen demand removed from the raw liquor by chemical treatment of the type specified in the table, multiplying this quantity by 100, and finally dividing by the proportion of biochemical oxygen demand removed from the raw unsettled liquor by simple settling over the length of time specified in the table. For example, if the biochemical oxygen demand of supernatant liquor recovered from a given type of chemical treatment of an aqueous liquor, after a given period of settling, was found to be 40 percent lower than that of the raw unsettled aqueous liquor, whereas the supernatant liquor obtained by simple settling of the same type of aqueous liquor was found to have a biochemical oxygen demand only 20 percent below that of the raw unsettled aqueous liquor, the "B.O.D. Index" of the chemically treated aqueous liquor would be calculated to be $(40/20) \times 100$, or 200.

The sanitary sewage used in the "First series" of examples below was taken from the municipal sewage system of a small city in the north central part of the United States, and contained all of the usual types of household and sanitary wastes, but essentially no industrial wastes. All of the examples (1 to 10 inclusive) of the "First series" involved the use of aliquots of the same batch of municipal sewage, having a chemical composition approximately normal for sanitary sewage in the United States, and being characterized by a pH of 7.6. The cationic starch employed in the "First series" was a cationic modified corn starch having approximately one amino group per 20 anhydroglucose units, and was characterized by a molecular weight of about 1,000,000. The ferruginous material employed in the "First series" comprised iron ore and/or ferric chloride, said iron ore consisting of hematite from the Mesabi Iron Range of northern Minnesota, in the United States, and graded so that substantially all of the iron ore passed through an 80-mesh U.S. Standard Screen, but was retained on a 100-mesh U.S. Standard Screen, while the ferric chloride employed was an ordinary grade (so-called "sewage-treatment grade") of ferric chloride. The (anionic) "organic polymer" (flocculating material) specified in the "First series" was a styrene-maleic anhydride copolymer of the type made by the general method set forth in U.S. Patent 2,333,513, and characterized by a molecular weight of about 100,000. The bentonite employed was a Wyoming-type bentonite, primarily in the sodium form, obtained in commercial deposits near Belle Fourche, South Dakota. "Cost of Chemicals per Million Gallons of Sewage Treated," wherever presented in this specification is based on the approximate 1959 costs of materials, f.o.b. St. Paul, Minn., U.S.A.: $0.0125 per pound of Wyoming bentonite; $0.01 per pound of Mesabi iron ore; $0.05 per pound of technical-grade ferric chloride; $0.17 per pound of cationic corn starch; and $0.50 per pound of styrene-maleic anhydride copolymer. Only approximate costs are given, since the synergistic effects obtained by interaction of the components in our combination frequently show a degree of effectiveness at least double—and sometimes ten times or more—that which might be reasonably expected on the basis of the performance of each of the separate ingredients of our combinations. Notice, for instance, in this "First series," that very small amounts of our type of additive, used in accordance with our invention, effects clarification of sewage at a tiny fraction (See Example 2) of the costs involved in admittedly unsuccessful attempts to clarify sewage to roughly the same degree by means of the component chemicals of our compositions, used separately (see Examples 6, 7, 8, 9 and 10), or conventional chemicals conventionally used (Example 7).

under very specific conditions, while others of the metals or metal compounds listed have fairly broad utility as catalysts for the oxidation of solids in, for example, sanitary sewages. We have found copper materials (e.g., soluble copper salts) especially useful as catalysts in the oxidation of municipal sewage: copper materials are effective at very low concentrations, are inherently cheap, and can be removed from the treated sewage (if necessary) by absorption on a regenerable ion exchanger (see Kunin and Barry, Industrial and Engineering Chemistry, 41, 1269 (1949)).

Example 11

In this experiment, compounds of various metals were added to 1000-milliliter samples of raw sewage in quantities as indicated in the table below. The samples were aerated for ten minutes by bubbling air through a fritted glass funnel one and one-half inches in diameter from the bottom of the sewage, up through the sewage, while said sewage was contained in a standard Imhoff cone of 1000-milliliter capacity. Then 3 parts Additive "Q" per million parts of sewage was added to each of the aerated sewage compositions, said Additive "Q" having been dispersed in water, at a solids concentration of 3 percent by weight, approximately 30 minutes prior to addition to the sewage, said Additive "Q" consisting of cationic starch, of the type employed in Example 2 above, Mesabi hematite, and anhydrous ferric chloride, in a cationic starch:hematite:ferric chloride ratio of 1:2:3. Each sewage composition was stirred for a few seconds, and 3 parts of Additive "R" per million parts of sewage next

FIRST SERIES (SANITARY SEWAGE)

| Example No. | Chemical Treatment | | | Observed Effects of Chem. Treatment | | | | | Cost of Chemicals Per Million Gallons of Sewage Treated |
|---|---|---|---|---|---|---|---|---|---|
| | Amount of Cationic Clarifying Material Used | | Amount of Negatively Charged Flocculating Material Added (p.p.m.) | After 7½ min. of settling | | After 15 Minutes of Settling | | | |
| | Catonic Starch (p.p.m.) | Ferruginous Material (p.p.m.) | | Settled Solids (ml.) | Clarity Index of Supernatant Fluid | Settled Solids (ml.) | Clarity Index of Supernatant Fluid | B.O.D. Index | |
| 1 | | | | 4.0 | 112 | 6.0 | 122 | 100 | $0.00 |
| 2 | 0.6 | 3 40/60 iron ore/FeCl₃. | 3 2,000/1 bent./org. polymer. | 5.0 | 134 | 8.5 | 138 | | 2.01 |
| 3 | 1.8 | 9 40/60 iron ore/FeCl₃. | 9 2,000/1 bent./org. polymer. | 14.0 | 136 | 13.0 | 140 | | 6.05 |
| 4 | 3.0 | 15 40/60 iron ore/FeCl₃. | 15 2,000/1 bent./org. polymer. | 31.0 | 49 | 33.0 | 149 | 269 | 10.05 |
| 5 | 6.0 | 30 40/60 iron ore/FeCl₃. | | 25.0 | 136 | 20.0 | 136 | 252 | 17.00 |
| 6 | | 30 iron ore only. | | 4.0 | 125 | 4.5 | 125 | 143 | 2.50 |
| 7 | | 30 FeCl₃ only. | | 14.0 | 125 | 15.0 | 128 | 215 | 12.50 |
| 8 | | | 30 bentonite only. | 3.5 | 123 | 5.0 | 128 | 104 | 3.12 |
| 9 | | | 30 org. polymer only. | 3.5 | 123 | 4.5 | 125 | 141 | 125.00 |
| 10 | 30 | | | 3.5 | 123 | 5.0 | 126 | 149 | 42.50 |

In the case of preferred embodiments of our invention (such as given in Examples 2 to 4 inclusive), the flocs formed on treatment of sanitary sewage are coarse and tough; there is some breaking up of the floc on vigorous stirring, but the floc reforms almost immediately on cessation of agitation, and settles rapidly and well, usually compressing in the sludge form over a period of time.

It has been noted above that certain metals or metal compounds, added to or placed in contact with sewage, may act as oxidation catalysts for the solids therein. Such catalysts have proved to be especially effective for the degradation of sewage solids by aeration, in the practice of our invention, although it should be realized that metals and metal compounds generally are regarded as undesirable in the aeration of sewage or such like. It should be noted also that, of the many metals and metal compounds listed as having some utility as catalysts in the treatment of sewage or such like, certain ones are essentially ineffective except on very specific types of sewage solids added to each of the sewage compositions, said Additive "R" having been dispersed in water, at a solids concentration of 3 percent by weight, approximately 30 minutes prior to the addition to the sawage, said Additive "R" consisting of Belle Fourche bentonite, of the type employed in Example 2 above (and styrene-maleic anhydride copolymer, of the type employed in Example 2 above, in a bentonite:copolymer ratio of 2000:1. The sewage composition was again stirred for a few seconds, and then again aerated for ten minutes by the same method as before. The samples were finally allowed to settle for 15 minutes. A 200 cc. aliquot was removed from the top of each sample and tested for dissolved oxygen by the "Dissolved Ogygen Test," as set forth in "Standard Methods for the Examination of Water, Sewage, and Industrial Wastes," the standard reference already mentioned previously herein. A standard Biochemical Oxygen Demand test was also performed on the samples with the best dissolved oxygen results and on a sample of raw sewage to which no catalyst (metal material) had been added.

| Sample | Reagent | Concentration of Reagent Solids (p.p.m.) | Dissolved Oxygen Content Immediately After 2nd Aeration (p.p.m.) | Biochemical Oxygen Demand 5-day (p.p.m.) |
| --- | --- | --- | --- | --- |
| I | Zinc sulfate | 2.0 | 4.15 | 1,385 |
| II | Manganese sulfate | 2.0 | 0 | |
| III | Chromite | 2.0 | 0 | |
| IV | Copper acetate | 2.0 | 5.1 | 1,205 |
| V | Manganese ore | 2.0 | 0 | |
| VI | Manganous oxide | 2.0 | 0 | |
| VII | Nickel acetate | 0.3 | 0 | |
| VIII | Ammonium molybdate | 0.3 | 0 | |
| IX | Silver nitrate | 0.3 | 0 | |
| X | Zirconium sulfate | 2.0 | 0 | |
| XI | Cobalt sulfate | 0.3 | 2.5 | 1,090 |
| XII | Polymerized ethylene imine | 2.0 | 0 | |
| XIII | Ilmenite composition | 2.0 | 1.0 | |
| XIV | Raw sewage, no aeration | 0 | 0 | 1,175 |

In the table above, Reagent I denotes a commercial grade of $ZnSO_4 \cdot H_2O$; Reagent II a crude commercial grade of manganese sulfate containing about 65 percent by weight of manganese sulfate, 10 percent by weight of ferrous sulfate, 7 percent by weight of silica, and minor amounts of oxides, sulfates, and phosphates of other elements; Reagent III an air-floated chromite having an average particle size such that 95 percent passed a 325-mesh U.S. Standard Screen, and having a chromium oxide content of about 44 percent by weight, an iron oxide content of about 25 percent by weight, a magnesium oxide content of about 10 percent by weight, a silica content of about 10 percent, the remainder being oxides, silicates, and the like of various other elements, especially aluminum and titanium; Reagent IV an essentially chemically pure grade of copper acetate; Reagent V a crude manganese oxide/silicate ore having a manganese content of about 41 percent, an iron content of about 5 percent, and a particle size of about 100-mesh (U.S. Standard Screens); Reagent VI a crude grade of manganese dioxide having a manganese content of about 48 percent and an average particle of about 100-mesh (U.S. Standard Screens); Reagent VII a substantially pure grade of nickel acetate; Reagent VIII an essentially pure grade of $(NH_4)_6Mo_7O_{24} \cdot 4H_2O_{11}$; Reagent IX an essentially pure form of silver nitrate; Reagent X a commercial grade of $Zr(SO_4)_2 \cdot 4H_2O$; Reagent XI a commercial grade of cobalt sulfate having a cobalt content of about 21 percent by weight: Reagent XII (not a metal compound or metal, but included in this example merely for purposes of comparison) a substantially linear polymer of ethylene imine having an average molecular weight of about 40,000; Reagent XIII an ilmenite composition formed by wetting, with four drops of concentrated sulfuric acid (98 percent), 3 grams of Virginia ilmenite having a titanium dioxide content of about 53 percent by weight (with the remainder being largely iron oxides and silicates) and an average particle size of about 50-mesh (U.S. Standard Screens), permitting the $H_2SO_4$-wetted ilmenite to stand at 70° F. for 4 minutes, and then adding 100 milliliters of water.

As the table above shows, chemically, the catalytic reaction provides a remarkable increase in the dissolved oxygen.

We have discovered a new class of polymers which are effective in the field of sewage treatment, and especially in the specialized field of sewage-sludge dewatering, both in themselves and with weighting agent and/or inorganic polyelectrolytic flocculating material or precursor to same (e.g. ferric chloride). We have called these new polymers "hybrid" polymers, since they generally consist of a central "water-insoluble" "core" of colloidal dimensions, to which have been grafted side chain material, generally of ionic character. We have made all possible combinations of central "core" (viz, cationic as in cationic starch; essentially neutral, as in unmodified corn starch; or anionic, as in carboxymethylcellulose) grafted, through intermediate linkage such as that provided by reaction with formaldehyde, glyoxal, or such like, or in some cases by ionic linkages such as hold together the ions in crystalline salts, all possible types of side chain material (viz, cationic, as in chains of polyethylene-imine and/or polyacrylamide having a very low content of carboxylate groups; essentially neutral, as in chains of polyvinyl alcohol; or anionic, as in chains of hydrolyzed polyacrylonitrile of relatively high carboxylate/amide ratio). Such cationic "hybrid" polymers as the reaction product of cationic starch, formaldehyde, and polyethyleneimine, or anionic analogues of such "hybrid" polymers have proved to be especially useful.

Surprisingly, in the specialized field of sewage-sludge dewatering, "hybrid" polymers having an essentially neutral or even anionic central "core" to which have been grafted (optionally) multiple side chains of cationic material function especially well. The major problem of dewatering sludge by chemical treatment appears to be the slowing down of the action of the de-watering chemical so that it can be mixed adequately with the sewage sludge before its charge is neutralized by reaction with sludge solids. Thus, de-watering chemicals (e.g., ferric chloride) encapsulated in slowly water-soluble material can be expected to perform more efficiently than the same chemical mixed directly in the sewage sludge. As pointed out in the examples below, we have made some polymers in which the colloidal central "core" of "insoluble" material is essentially neutral or somewhat anionic (e.g., starch, carboxymethylcellulose) and is grafted through reaction with formaldehyde to (optionally) multiple side chains of cationic material like polyacrylamide and/or polyethyleneimine; we theorize that the side chains "fold in" on the central "core" of oppositely charged material during drying of the chemical and also during dispersion in the sewage sludge, but that as hydration in the sludge occurs, the cationic chains "unfold" and produce the desired flocculating effect. Thus, one of the best sludge de-watering chemicals we have ever tested was made by dispersing slightly cross-linked polyacrylamide/polyacrylic acid salt in a large excess of dilute polyethyleneimine. We have also made compositions in which anionic side chains (e.g., polyacrylamide/polyacrylic acid salt of high carboxylate/amide ratio) are grafted with formaldehyde or such like to central "cores" of neutral or preferably cationic colloidal material such as cationic starch or cationic cellulose.

Example 12

In this experiment various reagents were used to dewater sludge. To 200 milliliter samples of sludge from a municipal treatment plant serving a small city in the north central part of the United States, various chemicals listed below were added. Water was filtered by vacuum through filter paper and the effluent was measured after 2 minutes of filtration.

| Sample | Reagent | Volume of Reagent Used, cc. | Volume of Filtered Effluent, cc |
|---|---|---|---|
| Control | None | | 47.5 |
| 12A | 50 cc. 3% polymerized ethyleneimine, 1.5 g. fatty acid (oleic), 50 g. water. | 3 | 58 |
| 12B | 50 cc. 3% hydrolyzed polyacrylonitrile, sodium salt, 1.5 g. fatty amine (cocoamine), 50 g. water. | 3 | 49 |
| 12C | 50 cc. 3% polymerized ethyleneimine, 100 drops 3% hydrolyzed polyacrylonitrile, sodium salt. | 3<br>1.5 | 152<br>130 |
| 12D | 65 g. water, 35 g. 3% polymerized N-methylethyleneimine, 1.8 cc. conc. hydrochloric acid, 1.7 g. sodium nitrate. | 3 | 77.5 |
| 12E | 50 g. 3% polymerized N-methylethyleneimine, 16 g. 3% hydrogen peroxide, 34 g. water. | 3 | 70 |
| 12F | 2 g. sodium sulfite, 2 g. 30% glyoxal, 90 g. water. | 3 | 57.5 |
| 12G | 3% polymerized ethyleneimine. | 3<br>1.5 | 146<br>114 |
| 12H | 3% hydrolyzed polyacrylonitrile, sodium salt. | 3 | 64 |
| 12I | 3% polymerized N-methylethyleneimine. | 3<br>1.5 | 100<br>83 |
| 12J | 3% sol of 1 part cationic starch 2 parts ferric chloride 3 parts 80 mesh iron ore. | 3 | 62.5 |
| 12K | 3% mixture of Wyoming bentonite containing 0.05% styrene/maleic anhydride copolymer). | 3 | 57.5 |

The polymerized ethyleneimine used in the examples had a molecular weight of about 40,000, and the polymerized N-methylethyleneimine had a molecular weight in approximately the same range. The hydrolyzed polyacrylonitrile employed was a slightly cross-linked commercial material having a molecular weight of about 200,000 and a nitrogen content of about 6 percent, obtained from American Cyanamid Company of Wayne, New Jersey, U.S.A.

We have found that mixtures of two or more metals or compounds in the treatment of some types of sewage react especially well as oxidation catalysts; evidently, the components of the catalyst mixture act synergistically with each other, so that the end result is much greater than could be reasonably expected by consideration of the individual components thereof. The exact nature and proportions of the components of the oxidation catalyst preferably should be changed to fit the type of solids in the sewage being oxidized, as by aeration in the presence of our novel sewage-oxidation catalyst; however, we have found that the best catalytic action is invariably obtained by use of sewage-oxidation catalyst comprising a plurality of materials selected from the following: iron, cobalt, manganese, osmium, silver, copper, tin, vanadium, cerium, titanium, platinum, nickel, uranium, chromium, mercury, molybdenum, aluminum, tungsten, selenium, palladium, and lead, and compounds of the aforesaid.

Example 13

Chemical reagents were formulated for use as sewage-treating chemicals, as follows:

To 10 cc. hot water add 1 gram of reagent from Group I; stir well. Add 0.1 gram paraformaldehyde. Shake well.

Add 1 gram of reagent from Group II.

Group I consisted of carboxymethylcellulose, cationic starch, corn starch.

Group II consisted of hydrolyzed polyacrylonitrile, sodium salt of same type as in Example 12, polymerized ethyleneimine, polyacrylamide.

The following combinations were prepared:

13A—Carboxymethylcellulose+hydrolyzed polyacrylonitrile, sodium salt+$CH_2O$
13B—Carboxymethylcellulose+polymerized ethyleneimine+$CH_2O$
13C—Cationic starch+hydrolyzed polyacrylonitrile, sodium salt+$CH_2O$
13D—Cationic starch+polymerized ethyleneimine+$CH_2O$
13E—Cationic starch±polyacrylamide+$CH_2O$
13F—Corn starch+polymerized ethyleneimine+$CH_2O$
13G—Corn starch+hydrolyzed polyacrylonitrile, sodium salt+$CH_2O$ The mixtures were evaporated to dryness in an oven at 300° F.

Each of the residues was redissolved in 10 milliliters of hot water and 0.5 gram iron ore fines added. The resulting mixture in each case was used as an additive for sewage.

Fine flocs formed when portions of the above reagents were added to sewage. Improved clarity was noted after standing over night.

To 5 milliliter portions of each of the redissolved residues were added 0.2 gram quantities of a mixture of 1 part cationic starch, 2 parts ferric chloride and 3 parts 80-mesh iron ore. The combinations were added to individual 50 milliliter aliquots of sewage.

| Reagents used: | Results observed in sewage |
|---|---|
| 13A* | Large, jelly-like floc. |
| 13B* | Good, heavy floc, rapid settling. |
| 13C* | Good floc but fine. |
| 13D* | Very fine floc. |
| 13E* | Coarse floc, slow in forming. |
| 13F* | Fine floc, much coarser after stirring and reforming. |
| 13G* | Heavy floc. |

*Plus 0.2 g. of a mixture of: 1 part cationic starch; 2 parts ferric chloride; 3 parts iron ore.

Example 14

A reagent was prepared for use as a sewage-treating chemical as follows:

To 100 cc. hot water add 1 g. of cationic starch. Shake. Add 0.1 g. paraformaldehyde. Shake. Add 2 g. 50% solids polymerized ethyleneimine (40,000 molecular weight). Let cool and stand 24 hours. 50 cc. of above mixture was evaporated to dryness. The residue was dispersed in 50 cc. hot water, and 1.5 g. of a combination of cationic starch, 2 parts ferric chloride, and 3 parts iron ore was added. The mixture was used as an additive for sewage. A floc formed on addition to 1000 cc. sewage. Half of the treated sewage was poured off and a small amount (0.05 g.) of chromic sulfate, silver metal, and copper metal were added. The mixture was allowed to stand in order to aerate. Further floc formed.

Unless otherwise stated in this specification, the nature of the cationic starch, polymer, or other chemical, its method of manufacture and/or use, its molecular weight, and/or such like, are the same as given for the chemical or other composition involved in our co-pending application for U.S. Letters Patent Ser. No. 206,184, filed June 29, 1962, now U.S. Patent No. 3,142,638 issued on July 28, 1964.

From the foregoing, the compositions of matter and processes of our invention will be readily understood. Numerous modifications and changes will readily occur to those skilled in the art after a consideration of the foregoing specification and accompanying claims.

It is not desired to limit the invention to the exact compositions and processes described, but rather we intend to include in the scope of our claims such minor modifications or substantial equivalents as may occur to one versed in the art provided with the benefit of our disclosure. In particular, we do not intend in any way to limit the breadth of our invention by the speculations above concerning possible mechanisms which might be useful in explaining the remarkable synergistic effects actually observed.

We claim:

1. As an additive for sewage, a composition of matter containing iron ore weighting agent having a particle size smaller than 50 mesh (U.S. Standard Screens), and water-dispersible synthetic organic cationic polyelectrolytic flocculating material having a molecular weight in excess of 10,000 and at least one amine group per 10,000 units of molecular weight, the main bodies of the polymer molecules of said water-dispersible synthetic organic cationic polyelectrolytic flocculating material bearing overall positive electrical charges in dispersion in ordinary sewage.

2. A process of treating sewage which comprises (a) admixing said sewage with a composition of matter according to claim 1, said composition of matter being employed in an amount, from 1 to 300 parts by weight per millon parts of sewage, sufficient to cause flocculation and accelerated sedimentation of solids in said sewage, (b) flocculation and accelerated sedimentation of said solids, (c) separation from the sewage composition formed an aqueous portion substantially free of suspended solids, and (d) contacting of said aqueous portion with air in the presence of oxidation catalyst, said oxidation catalyst comprising a plurality of materials selected from the following: iron, cobalt, manganese, osmium, silver, copper, tin, vanadium, cerium, titanium, platinum, nickel, uranium, chromium, mercury, molybdenum, aluminum, tungsten, selenium, palladium, and lead, and compounds of any of the aforesaid.

3. A process for separating solids from sewage, in which there is admixed with said sewage iron ore weighting agent having a particle size smaller than 50 mesh (U.S. Standard Screens), and water-dispersible cationic starch polyelectrolytic flocculating material having a molecular weight in excess of 10,000 and at least one amine group per 10,000 units of molecular weight, said starch material being employed in an amount, from 1 to 300 parts by weight per million parts of sewage, sufficient to cause flocculation and accelerated sedimentation of solids, and in which, after said flocculation and accelerated sedimentation of solids, there is separated from the sewage composition formed an aqueous portion substantially free of suspended solids.

4. As an additive for sewage, a composition of matter containing iron ore weighting agent having a particle size smaller than 50 mesh (U.S. Standard Screens), and water-dispersible cationic starch polyelectrolytic flocculating material having a molecular weight in excess of 10,000 and at least one amine group per 10,000 units of molecular weight.

5. As an additive for sewage, a composition of matter containing iron ore weighting agent having a particle size smaller than 50 mesh (U.S. Standard Screens), inorganic cationic polyelectrolytic flocculating aid, and water-dispersible synthetic organic cationic polyelectrolytic flocculating material having a molecular weight in excess of 10,000 and at least one amine group per 10,000 units of molecular weight.

6. As an additive for sewage, a composition of matter containing iron ore weighting agent having a particle size smaller than 50 mesh (U.S. Standard Screens), iron salt reactive with water to form iron hydroxide, and water-ispersible cationic starch polyelectrolytic flocculating material having a molecular weight in excess of 10,000 and at least one amine group per 10,000 units of molecular weight.

7. As an additive for sewage, a composition of matter containing iron ore weighting agent having a particle size smaller than 50 mesh (U.S. Standard Screens), aluminum salt reactive with water to form aluminum hydroxide, and water-dispersible cationic starch polyelectrolytic flocculating material having a molecular weight in excess of 10,000 and at least one amine group per 10,000 units of molecular weight.

8. A process for separating solids from sewage, in which there are admixed with said sewage iron ore weighting agent having a specific gravity in excess of 1 and having a particle size smaller than 50 mesh (U.S. Standard Screens), inorganic cationic polyelectrolytic flocculating aid, and water-dispersible synthetic organic cationic polyelectrolytic flocculating material having a molecular weight in excess of 10,000 and at least one amine group per 10,000 units of molecular weight, said water-dispersible synthetic organic cationic polyelectrolytic flocculating material being employed in an amount, from 1 to 300 parts by weight per million parts of sewage, sufficient to cause flocculation and accelerated sedimentation of solids, and in which, after said flocculation and accelerated sedimentation of solids, there is separated from the sewage composition formed an aqueous portion substantially free of suspended solids.

9. A process for separating solids from sewage, in which there is admixed with said sewage iron ore weighting agent having a particle size smaller than 50 mesh (U.S. Standard Screens), inorganic cationic polyelectrolytic flocculating aid, and water-dispersible cationic starch polyelectrolytic flocculating material having a molecular weight in excess of 10,000 and at least one amine group per 10,000 units of molecular weight, said starch material being employed in an amount, from 1 to 300 parts by weight per million parts of sewage, sufficient to cause flocculation and accelerated sedimentation of solids, and in which, after said flocculation and accelerated sedimentation of solids, there is separated from the sewage composition formed an aqueous portion substantially free of suspended solids.

10. A process for separating solids from sewage, in which there is admixed with said sewage iron ore weighting agent having a particle size smaller than 50 mesh (U.S. Standard Screens), iron salt reactive with water to form iron hydroxide, and water-dispersible cationic starch polyelectrolytic flocculating material having a molecular weight in excess of 10,000 and at least one amine group per 10,000 units of molecular weight, said starch material being employed in an amount, from 1 to 300 parts by weight per million parts of sewage, sufficient to cause flocculation and accelerated sedimentation of solids, and in which, after said flocculation and accelerated sedimentation of solids, there is separated from the sewage composition formed an aqueous portion substantially free of suspended solids.

11. A process for separating solids from sewage, in which there is admixed with said sewage iron ore weighting agent having a particle size smaller than 50 mesh (U.S. Standard Screens), aluminum salt reactive with water to form aluminum hydroxide, and water-dispersible cationic starch polyelectrolytic flocculating material having a molecular weight in excess of 10,000 and at least one amine group per 10,000 units of molecular weight, said starch material being employed in an amount, from 1 to 300 parts by weight per million parts of sewage, sufficient to cause flocculation and accelerated sedimentation of solids, and in which, after said flocculation and accelerated sedimentation of solids, there is separated from the sewage composition formed an aqueous portion substantially free of suspended solids.

12. A process for separating solids from sewage, in which there is admixed with said sewage separately (a) iron ore weighting agent having a specific gravity in excess of 1 and having a particle size smaller than 50 mesh (U.S. Standard Screens), inorganic cationic polyelectrolytic flocculating aid, and water-dispersible synthetic organic cationic polyelectrolytic flocculating material having a molecular weight in excess of 10,000 and at least one amine group per 10,000 units of molecular weight, said water-dispersible synthetic organic cationic polyelectrolytic flocculating material being employed in an amount, from 1 to 300 parts by weight per million parts of sewage, sufficient to cause flocculation and accelerated sedimentation of solids, and (b) anionic flocculating material, and in which, after said flocculation and accelerated sedimentation of solids, there is separated from the sewage composition formed an aqueous portion substantially free of suspended solids.

13. A process for separating solids from sewage, in which there is admixed with said sewage separately (a) iron ore weighting agent having a specific gravity in excess of 1 and having a particle size smaller than 50 mesh (U.S. Standard Screens), iron salt reactive with water to form iron hydroxide, and water-dispersible cationic starch polyelectrolytic flocculating material having a molecular weight in excess of 10,000 and at least one amine group per 10,000 units of molecular weight, said water-dispersible cationic starch polyelectrolytic flocculating material being employed in an amount, from 1 to 300 parts by weight per million parts of sewage, sufficient to cause flocculation and accelerated sedimentation of solids, and (b) anionic flocculating material, and in which, after said flocculation and accelerated sedimentation of solids, there is separated from the sewage composition formed an aqueous portion substantially free of suspended solids.

14. A process for separating solids from sewage, in which there is admixed with said sewage separately (a) iron ore weighting agent having a specific gravity in excess of 1 and having a particle size smaller than 50 mesh (U.S. Standard Screens), iron salt reactive with water to form iron hydroxide, and water-dispersible cationic starch polyelectrolytic flocculating material having a molecular weight in excess of 10,000 and at least one amine group per 10,000 units of molecular weight, said water-dispersible cationic starch polyelectrolytic flocculating material being employed in an amount, from 1 to 300 parts by weight per million parts of sewage, sufficient to cause flocculation and accelerated sedimentation of solids, and (b) Wyoming-type bentonite clay, and in which, after said flocculation and accelerated sedimentation of solids, there is separated from the sewage composition formed an aqueous portion substantially free of suspended solids.

15. A process for separating solids from sewage, in which there is admixed with said sewage separately (a) iron ore weighting agent having a specific gravity in excess of 1 and having a particle size smaller than 50 mesh (U.S. Standard Screens), iron salt reactive with water to form iron hydroxide, and water-dispersible cationic starch polyelectrolytic flocculating material having a molecular weight in excess of 10,000 and at least one amine group per 10,000 units of molecular weight, said water-dispersible cationic starch polyelectrolytic flocculating material being employed in an amount, from 1 to 300 parts by weight per million parts of sewage, sufficient to cause flocculation and accelerated sedimentation of solids, and (b) Wyoming-type bentonite and water-dispersible styrene-maleic anhydride copolymer having a molecular weight of about 100,000.

16. As an additive for sewage, a composition of matter comprising an organic polyelectrolyte having a substantially water-insoluble central organic core of colloidal dimensions, to which have been grafted essentially linear polyionic side-chain materials, and iron ore weighting agent having a specific gravity in excess of 1 and preferably above 3 and having a particle size smaller than 50 mesh (U.S. Standard Screens).

17. A process for separating solids from sewage, in which there is admixed with said sewage a composition of matter according to claim 16, said composition of matter being employed in an amount, from 1 to 300 parts by weight per million parts of sewage, sufficient to cause flocculation and accelerated separation of solids, and in which, after said flocculation and accelerated separation of solids, there is separated from the sewage composition formed an aqueous portion substantially free of suspended solids.

References Cited

UNITED STATES PATENTS

| | | | |
|---|---|---|---|
| 2,690,425 | 9/1954 | Moses et al. | 210—63 X |
| 2,867,584 | 1/1959 | Scott | 252—85 |
| 3,095,391 | 6/1963 | Brockway et al. | 260—17.4 |
| 2,980,609 | 4/1961 | House et al. | 210—54 |

MICHAEL E. ROGERS, *Primary Examiner.*

U.S. Cl. X.R.

210—52, 54; 252—181; 260—17.4